US007021637B2

(12) United States Patent
Snider et al.

(10) Patent No.: US 7,021,637 B2
(45) Date of Patent: Apr. 4, 2006

(54) WORK BOX

(75) Inventors: Gregory S. Snider, Bel Air, MD (US); Jason Busschaert, Ottawa (CA); Clifford D. Read, Carp (CA); Michael G. Sirois, Ottawa (CA); James E. Pangerc, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 132 days.

(21) Appl. No.: 10/633,746

(22) Filed: Aug. 4, 2003

(65) Prior Publication Data

US 2005/0029774 A1 Feb. 10, 2005

(51) Int. Cl.
*B62J 1/00* (2006.01)

(52) U.S. Cl. ....................... 280/37; 280/63; 280/47.33; 203/373

(58) Field of Classification Search ................ 206/372, 206/373; 280/37, 63, 47.131, 47.24, 47.26, 280/47.33, 35, 33.991, 33.992, 33.998
See application file for complete search history.

(56) References Cited

U.S. PATENT DOCUMENTS

| | | | | |
|---|---|---|---|---|
| 3,118,580 | A | | 1/1964 | Manshel |
| 3,216,686 | A | | 11/1965 | Bjerre |
| D283,084 | S | | 3/1986 | Bannigan |
| 4,720,021 | A | * | 1/1988 | Byrns ......................... 220/764 |
| 4,765,472 | A | | 8/1988 | Dent |
| 4,773,535 | A | | 9/1988 | Cook |
| 4,917,281 | A | | 4/1990 | Ostermiller |
| 4,993,551 | A | | 2/1991 | Lindsay |
| 5,013,055 | A | | 5/1991 | Labrum |
| 5,174,447 | A | | 12/1992 | Fleming |
| 5,244,265 | A | | 9/1993 | Chiang |
| D343,490 | S | | 1/1994 | Ramsey |
| D345,237 | S | | 3/1994 | Stein |
| D354,596 | S | | 1/1995 | Dancyger |
| D355,062 | S | | 1/1995 | Maire et al. |
| D356,677 | S | | 3/1995 | Kalasountas |
| 5,433,152 | A | | 7/1995 | Henry |
| D361,910 | S | | 9/1995 | Maple et al. |
| 5,547,080 | A | | 8/1996 | Klimas |
| D376,454 | S | | 12/1996 | Fierek et al. |
| 5,647,453 | A | * | 7/1997 | Cassells ...................... 182/129 |
| D381,807 | S | | 8/1997 | Pickle |
| D388,919 | S | | 1/1998 | Maire et al. |
| D396,912 | S | | 8/1998 | Maire et al. |
| 5,848,701 | A | | 12/1998 | Riccabona |
| 5,879,072 | A | | 3/1999 | Huang |
| D409,346 | S | | 5/1999 | Hurt |
| D414,337 | S | | 9/1999 | Hubert |
| 6,085,902 | A | | 7/2000 | Fang |
| 6,176,559 | B1 | | 1/2001 | Tiramani et al. |
| 6,189,697 | B1 | | 2/2001 | Davis |
| D441,161 | S | | 4/2001 | Shetterly |
| D447,630 | S | * | 9/2001 | Snider ......................... D3/283 |

(Continued)

*Primary Examiner*—Christopher P. Ellis
*Assistant Examiner*—Brian Swenson
(74) *Attorney, Agent, or Firm*—Harness, Dickey & Pierce, P.L.C.

(57) ABSTRACT

A work box to be combined with a work table has a base with at least one extending side wall enclosing a tool retaining area. An interruption is formed in the base to define a gap for receiving a support on the work table. The support mounts the base and, in turn, the work box onto the support and the work table.

17 Claims, 4 Drawing Sheets

U.S. PATENT DOCUMENTS

| | | | | |
|---|---|---|---|---|
| 6,286,824 | B1 * | 9/2001 | Sagol | 269/99 |
| D459,882 | S | 7/2002 | Yuen | |
| 6,428,181 | B1 | 8/2002 | Moriarty | |
| 6,435,389 | B1 * | 8/2002 | Sucher | 224/576 |
| 6,536,590 | B1 | 3/2003 | Godshaw et al. | |
| 6,564,941 | B1 * | 5/2003 | Hedges | 206/373 |
| D482,208 | S * | 11/2003 | Fortin et al. | D6/400 |
| 6,766,881 | B1 * | 7/2004 | Carty | 182/129 |
| 2002/0003098 | A1 | 1/2002 | Bell | |
| 2002/0088729 | A1 | 7/2002 | Urbanski | |

* cited by examiner

WORK BOX

FIELD OF THE INVENTION

The present invention relates to a work box and, more particularly, to a work box carrying power tools mountable onto a work table.

SUMMARY OF THE INVENTION

BACKGROUND OF THE INVENTION

Various types of work boxes or tool boxes exist in the art. These various boxes have varying features and appear to be satisfactory for their intended purpose. However, several of these work boxes or tool boxes do not lend themselves to ready attachment with a work table. Thus, it is desirable to have a work box which is readily attachable and supported by a work table.

The present invention provides the art with a work box which is readily attachable to a work table. The work box is supported and mounted on the table support so that, when the table is collapsed, the box remains on the table support. Thus, the box may be wheeled with the table from one position to another. The invention provides a box which includes a base having an interruption forming a gap which is received onto a support on the work table. The box is secured to the work table support to enable the box to be coupled with the table during movement.

In a first aspect of the invention, a work box comprises a base with at least one extending sidewall. This sidewall encloses a tool retaining area. An interruption is formed in the base. The interruption defines a gap on the exterior of the base to receive a support to mount the base and work box on the support. The work box may include a strap to further secure the box to the support. The interruption divides the tool retaining space. A power outlet is coupled on the exterior surface of the wall. Ordinarily, a top covers the at least one wall. Preferably, the box has an overall rectangular configuration.

According to a second aspect of the invention, a work box in combination with a work table comprises a work table with a table positionable above the ground in a horizontal position. The support assembly is coupled with the table to support the table above the ground. Also, a horizontal support member is positioned at a desired distance above the ground. A work box has a base with at least one extending sidewall enclosing a tool retaining area. An interruption is formed in the base. The interruption defines a gap which is positioned about the horizontal support to mount the base and in turn the work box on the horizontal support. The horizontal support is positioned by a pair of vertical supports. The work table support assembly is collapsible and includes wheels to move the table from one position to another. The work box remains on the work table support assembly in the collapsed position. A strap on the work box passes around the vertical supports to secure the work box onto the support assembly. The base interruption divides the tool retaining space into two areas, one on one side of the horizontal support and one on the other. A power outlet is positioned on the exterior surface of the wall of the work box. The work box preferably has a rectangular shape with a cover covering the wall.

From the following detailed description taken in conjunction with the accompanying drawings and the appended claims, other objects and advantages of the present invention will become apparent to those skilled in the art.

DETAILED DESCRIPTION OF THE PREFERRED EMBODIMENTS

Figure 1:
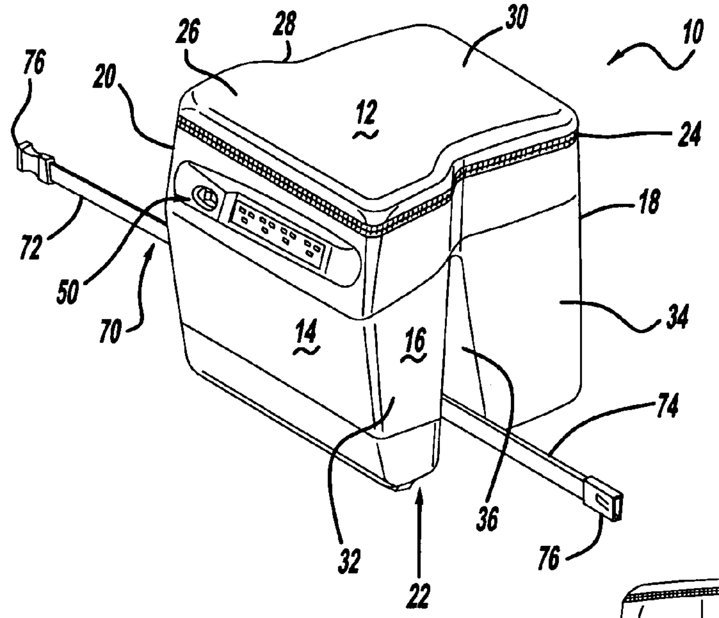
FIG. 1 is a perspective view of a work box, in accordance with the present invention.

Turning to FIG. 1, a work box is illustrated and designated with the reference numeral 10. The work box has an overall rectangular configuration and includes a top 12, walls 14–20, and base 22.

The top 12 is usually made from cloth material and may include a foam inner layer. The top cover 12 is attached at the back wall 18. A zipper 24 is positioned on walls 14, 16 and 20 to secure the top cover 12 to the walls 14, 16 and 20. The top cover 12 has a first rectangular portion 26 continuous with a diverging portion having curved sides 28 which is continuous with a second rectangular portion 30. The top cover follows the contour periphery of the walls 14, 16 and 20.

The sidewalls 16 and 20 are substantially identical to one another. The sidewalls 16 and 20 include a first 32 and second 34 rectangular portion separated by a gap 36. A connecting portion 40 connects the first 32 and second 34 wall portions with one another.

The front wall 14 is substantially rectangular and is continuous with the first portions 32 of the sidewalls 16 and 20. The front wall 14 includes an electrical plug-in strip 50. The plug-in strip 50 enables power tools to be plugged directly into the strip and to be utilized at the work site. A cord (not shown) is connected with the power strip to enable electricity to be brought to the work box.

Figure 2:
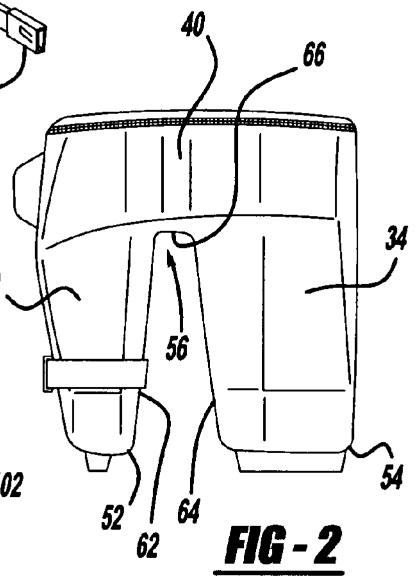
FIG. 2 is side plan view of the work box of FIG. 1.

The base 22 includes two rectangular portions 52 and 54 divided by an interruption portion 56. The two rectangular portions 52 and 54 include feet 58 and 60 which enable the work box to be positioned onto the ground or the like. The interruption portion 56 includes two angled walls 62 and 64 which converge at their apex 66. Thus, the interrupt portion 56 defines the gap 36 which, when viewed from side plan, has an overall inverted U shape. The apex 66 has a desired width as seen in FIG. 2 to enable the work box to rest on a support as defined herein.

A strap 70 having two ends 72 and 74 extends from the angled wall 62. The straps 72 and 74 include a buckle 76 which enable the strap portions 72 and 74 to be positioned around a support to secure the work box onto a work support as shown and described herein.

Turning to FIGS. 3–7, a better understanding of the work box with a work table will be described.

The work table 100 includes a table portion 102 and a support 104. The work table 100 is generally like those sold under the Workmate® trademark by Black & Decker Inc.

The table 102 is generally positioned at a desired distance along a horizontal plane above the ground by the support 104. The table 102 may include two pieces which may be connected by a vise-like device.

Figure 7:
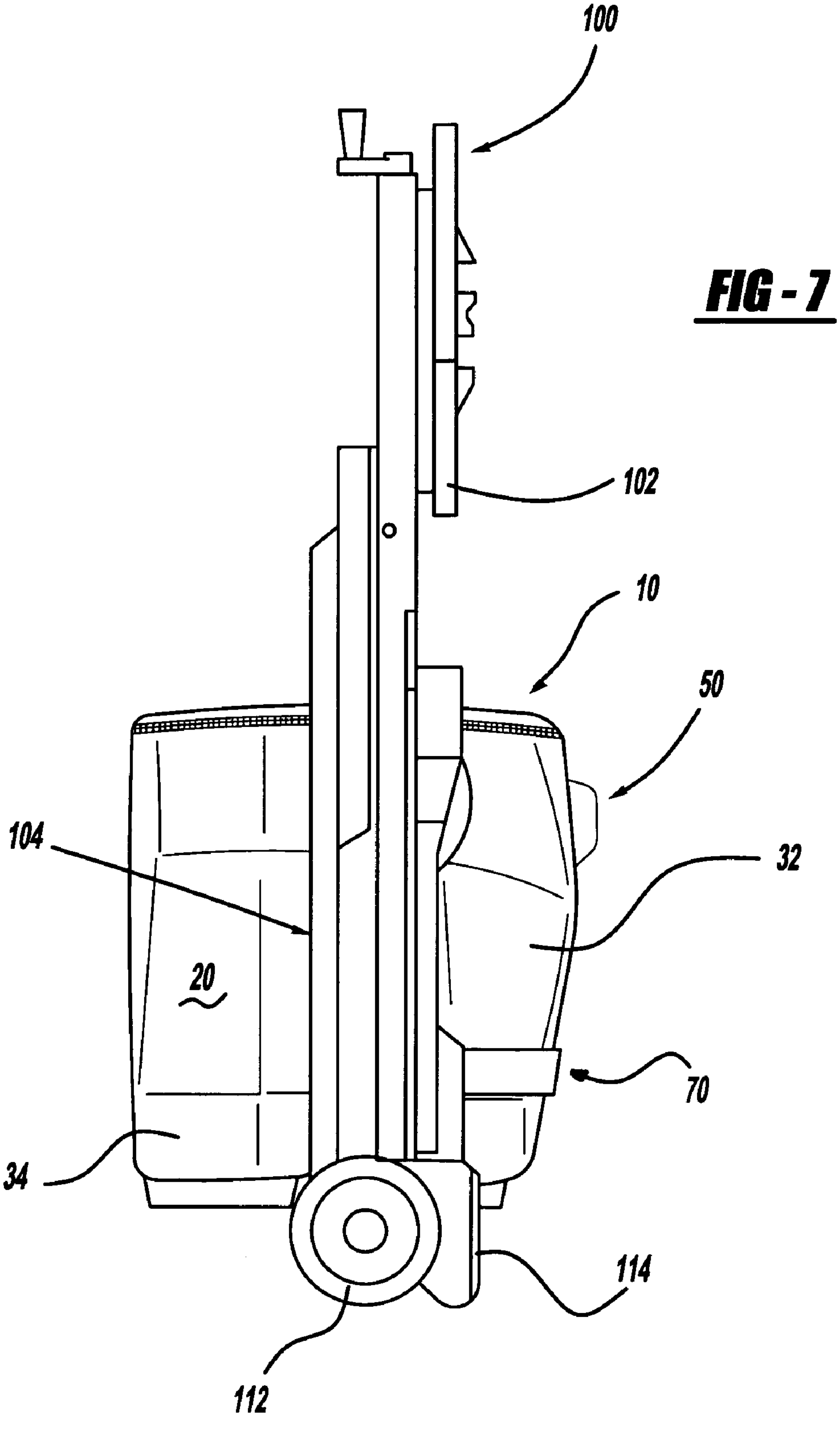
FIG. 7 is a perspective view of the work box with the work table in a collapsed position.

The support 104 includes legs 106 and 108 as well as a U-shaped base 110. The U-shaped base 110 includes wheels 112, as well as feet 114. The wheels 112 enable transport of the table as illustrated in FIG. 7 when the table is collapsed. The feet 114 steady the work table when it is in a use position. The table includes a horizontal support 120 which is connected to the legs 106, 108 by vertical supports 122 and 124. The vertical supports are secured to the legs 106 and 108, respectively.

Figure 4:
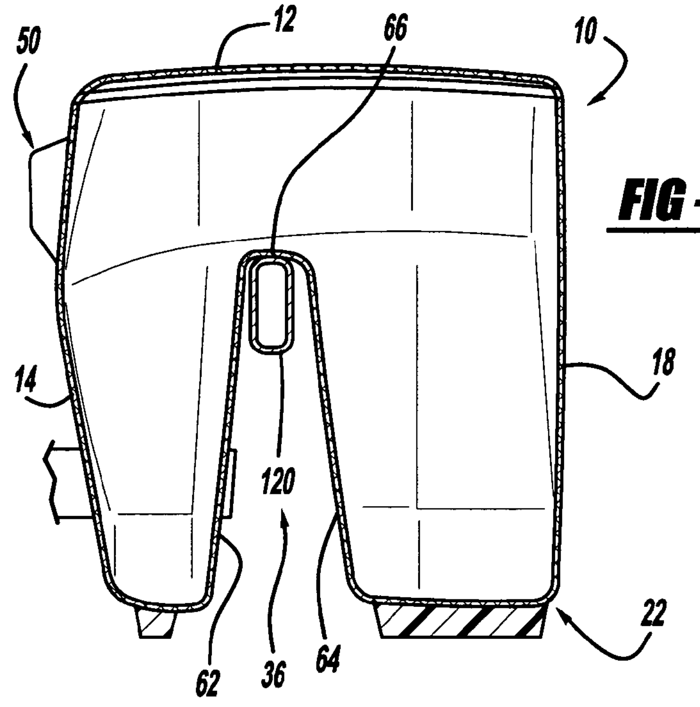
FIG. 4 is a cross section view of FIG. 3, along line 4—4 thereof.
Figure 5:
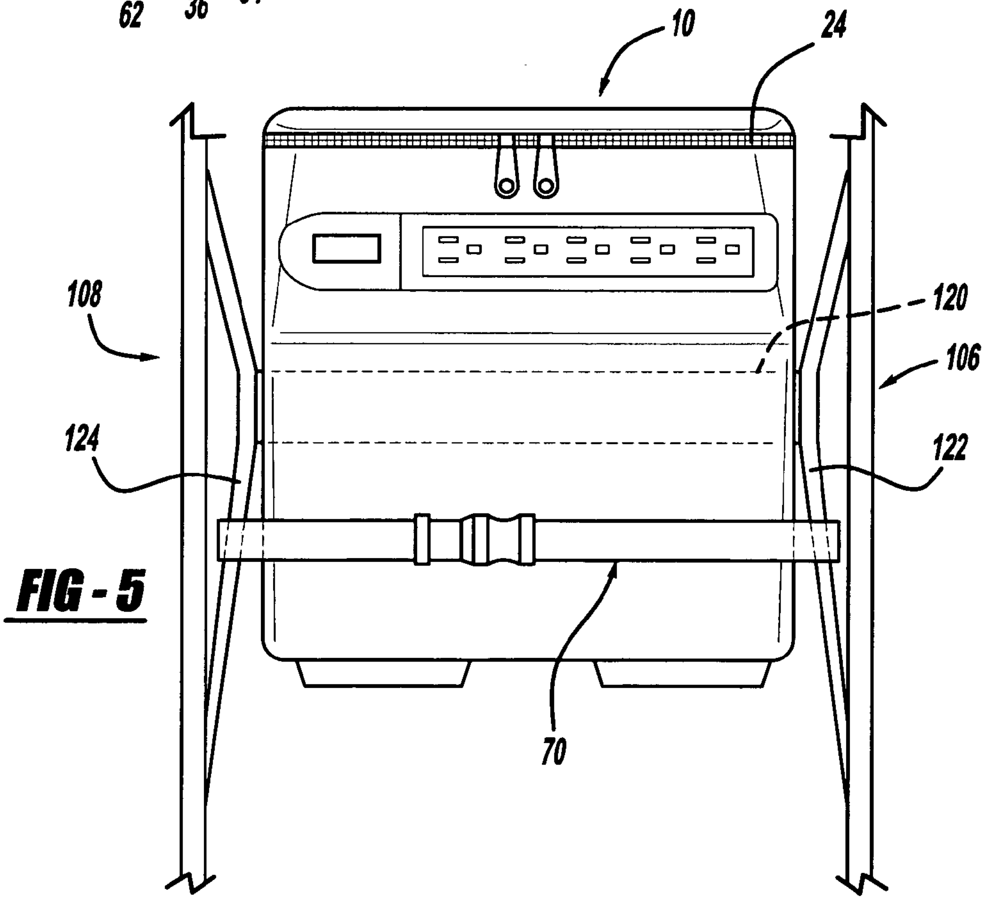
FIG. 5 is a front plan view of FIG. 3.

The work box 10 is positioned onto the work table 100 so that the U-shaped gap 36 passes over the horizontal support 120. The apex 66 of the angled walls 62 and 64 rest on the horizontal support 120, as seen in FIGS. 4 and 5. The strap portions 72 and 74 are wrapped around the vertical supports 122 and 124 to further secure the work box 10 onto the work table 100 (FIG. 5). The buckle mechanism 76 is secured together and, the straps 72 and 74 may be tightened to remove the slack.

Figure 3:
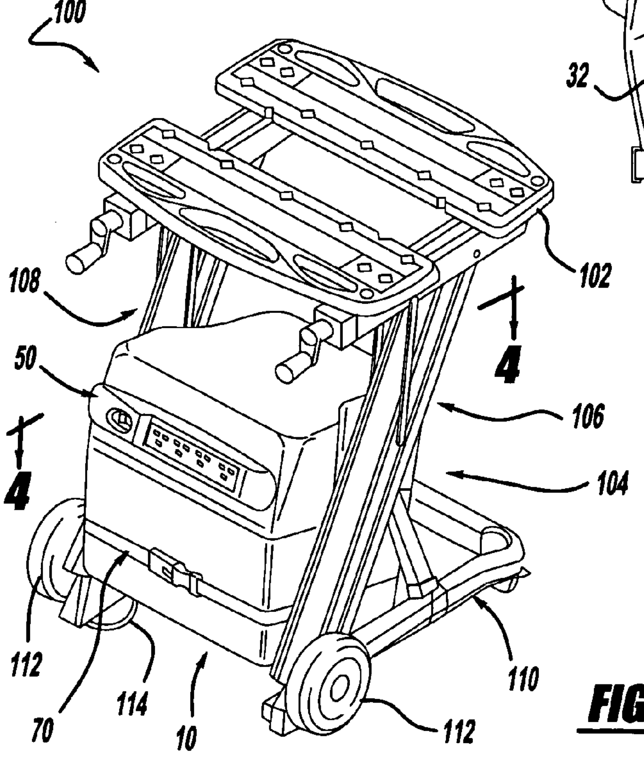
FIG. 3 is a perspective view of the work box coupled with a work table.
Figure 6:
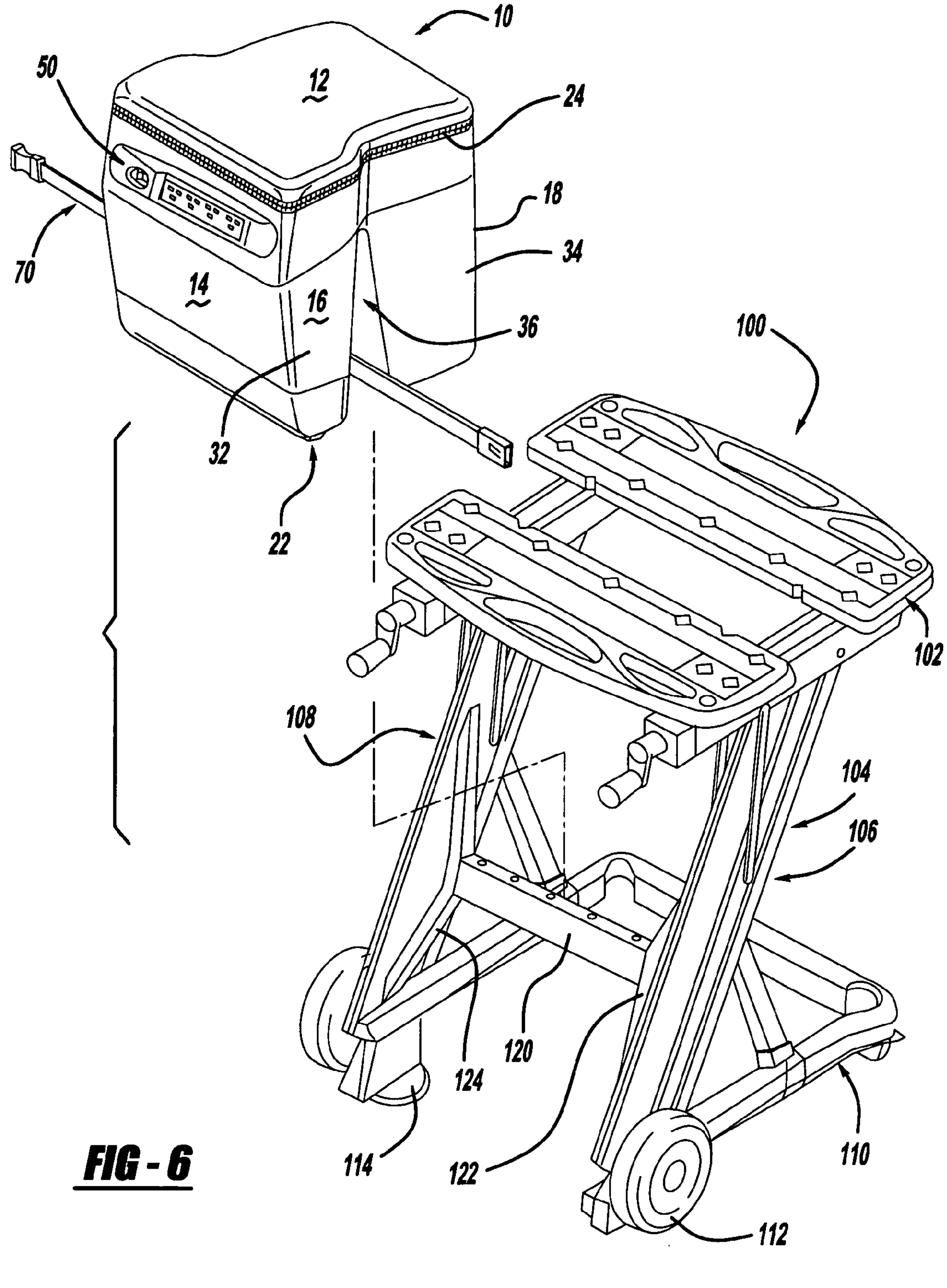
FIG. 6 is an exploded perspective view of FIG. 3.

Once the work box 10 is secured onto the work table 100, the work box 10 is maintained on the horizontal support 120 in an extended or use position as illustrated in FIGS. 3 and 6. Also, the work box 10 remains on the work table 100 when the work table 100 is in a collapsed position as illustrated in FIG. 7. Thus, the work box 10 is maintained on the work table 100 while it is moved from work area to work area, via the wheels 112.

While the above detailed descriptions provides a discussion of the preferred embodiment of the present invention, it can be understood that the present invention is susceptible to modification, variation and alteration without deviating from the scope of the attached claims.

What is claimed is:

1. A work box comprising:

a base having a circumferential edge, at least one side wall extending from said circumferential edge enclosing a tool retaining area;

an interruption in said base spanning from one side of the circumferential edge to another and open at said sides of said circumferential edge, said interruption defining a gap for receiving a support for mounting said base on the support.

2. The work box according to claim 1, further comprising a strap for securement to the support.

3. The work box according to claim 1, wherein said base interruption divides said tool retaining space.

4. The work box of claim 1, further comprising a power outlet on an exterior surface of said wall.

5. The work box of claim 1, wherein a top covers said at least one extending wall.

6. The work box of claim 1, wherein said base has an overall rectangular shape.

7. The work box according to claim 1, wherein said gap extends from said base vertically to at least half way up said at least one side wall.

8. A work box in combination with a work table comprising:

a work table having a table positionable above the ground in a horizontal position;

a support assembly coupled with said table supporting said table above the ground and a horizontal support member coupled with said support assembly and positioned a desired distance above the ground;

a work box including a base with at least one extending side wall enclosing a tool retaining area;

an interruption in said base, said interruption defining a gap for receiving said horizontal support for mounting said base on the support assembly;

wherein said work box positioned with respect to said work table such that said horizontal support is positioned in said gap for supporting said work box on said work table.

9. The combination according to claim 8, wherein said horizontal support is positioned by a pair of vertical supports.

10. The combination according to claim 8, wherein said support assembly is collapsible.

11. The combination according to claim 10, wherein said work box remains on said work table support assembly in said collapsed position.

12. The combination according to claim 8, wherein said support assembly includes wheels.

13. The combination according to claim 8, further comprising a strap for securing said work box to said support assembly.

14. The combination according to claim 8, wherein said base interruption divides said tool retaining space.

15. The combination according to claim 8, further comprising a power outlet on an exterior surface of said wall.

16. The combination according to claim 8, wherein a top covers said at least one extending wall.

17. The combination according to claim 8, wherein said base has an overall rectangular shape.

* * * * *